United States Patent [19]

Baumgartner

[11] 4,020,483

[45] Apr. 26, 1977

[54] CIRCUIT ARRANGEMENT FOR DISPLACING CHARACTERS ON THE SCREEN OF A DATA VIEWING DEVICE

[75] Inventor: Heinrich Baumgartner, Munich, Germany

[73] Assignee: Siemens Aktiengesellschaft, Berlin & Munich, Germany

[22] Filed: Aug. 19, 1975

[21] Appl. No.: 605,915

[30] Foreign Application Priority Data

Sept. 25, 1974 Germany .......................... 2445816

[52] U.S. Cl. ........................... 340/324 AD; 178/30

[51] Int. Cl.$^2$ ........................................... G06F 3/14

[58] Field of Search ................ 340/324 AD, 324 A; 178/30

[56] References Cited

UNITED STATES PATENTS

| | | | |
|---|---|---|---|
| 3,242,470 | 3/1966 | Hagelbarger et al. | 340/324 AD |
| 3,437,873 | 4/1969 | Eggert | 340/324 AD |
| 3,568,178 | 3/1971 | Day | 340/324 AD |
| 3,643,252 | 2/1972 | Roberts, Jr. | 340/324 AD |
| 3,868,672 | 2/1975 | Johnson | 340/324 AD |
| 3,877,007 | 4/1975 | Fishman | 340/324 AD |

*Primary Examiner*—Marshall M. Curtis
*Attorney, Agent, or Firm*—Hill, Gross, Simpson, Van Santen, Steadman, Chiara & Simpson

[57] ABSTRACT

A circuit arrangement for displacing characters representing an image content on the screen of a data viewing device, in which the characters are represented in a plurality of rows and a plurality of columns, and in which a electron beam is moved over the screen by a first deflecting signal in the vertical direction and by a second deflecting signal in the horizontal direction, employs a deflecting stage which produces a further saw-tooth shaped deflecting signal which, in consecutive intervals of time, uniformly adds parts of the image content at one edge of the screen and at the same time removes corresponding parts at the opposite edge of the screen, and an adder which adds the further deflecting signal to the first and/or second deflecting signal.

5 Claims, 5 Drawing Figures

CIRCUIT ARRANGEMENT FOR DISPLACING CHARACTERS ON THE SCREEN OF A DATA VIEWING DEVICE

BACKGROUND OF THE INVENTION

1. Field of the Invention

The invention relates to a circuit arrangement for displacing characters representing an image content of the screen of a data viewing device in which the characters are represented in a plurality of rows and a plurality of columns, and in which an electron beam is moved by a first deflection signal in the vertical direction and by a second deflection signal in the horizontal direction over the screen.

2. Description of the Prior Art

It is already known in the art to displace characters on the screen of a data viewing device when the number of characters to be represented in greater than the number of characters which can be represented on the screen. In these known data viewing devices, the characters on the screen are displaced by rows in the upward or the downward direction. New characters are represented in the rows which are thus free. This type of displacement of characters is known as the "rolling page" function. An article by J. Hochmuth and Hermann Lang, Datensichtstation Transdata 8152 for Graphik und Alphanumerik, Siemens-Zeitschrift 48 (1974) Ed. 1, for example, describes a row-by-row displacement of the characters in the upward direction known as "roll up."

The known data viewing devices in which the characters are displaced by rows and by stages have the disadvantage that as a result of the sudden change in the rows, it is oftern very difficult to read out the characters on the screen.

SUMMARY OF THE INVENTION

The object of the invention is to provide a circuit arrangement by means of which the disadvantages of a sudden displacement of the characters on the screen are avoided.

According to the invention, the foregoing object is realized in a circuit arrangement of the type generally described above by a deflecting stage which produces a saw-tooth shaped further deflecting signal which, in consecutive intervals of time, uniformly adds part of the image content at one edge of the screen and removes corresponding components at the same time at the opposite edge of the screen, and by an adder which adds the further deflecting signal to the first and/or second deflecting signal.

The circuit arrangement constructed in accordance with the invention has the advantages that an observer can very easily follow the characters represented on the screen, and that the observer can easily find his way about the screen. Also, the circuit arrangement requires a minimum expense and can also be subsequently installed in already existing data viewing devices in a simple manner.

The displacement of the characters on the screen is carried out particularly simply if the amplitude of the further deflecting signal is equal to the first or second deflecting signal assigned to a row or column, and if the deflecting stage produces a pulse which displaces the characters by one row or column when the further deflecting signal reaches its amplitude.

An exemplary embodiment of the circuit arrangement according to the invention is characterized by a deflecting stage which consists of a saw-tooth generator which produces the further deflecting signal, and of a pulse converter which produces the pulse from the further deflecting signal when that signal has reached its maximum amplitude. In particular, it is advantageous if a differentiator element is provided as the pulse converter.

A further exemplary embodiment of the circuit arrangement comprises a deflecting stage which consists of a pulse generator for producing timing pulses, a counter which counts the times pulses and which emits a transfer signal as a pulse whenever the final count is reached, and a digital-analog converter which is connected to the outputs of the counter and which emits the further deflecting signal at its output.

If the characters are represented on the screen of a data viewing device in which the electron beam is moved line-by-line over the screen, and in which an image generator is provided which effects the assignment of the rows to the lines and which produces a video signal to illuminate the electron beam on the screen, it is advantageous for the deflecting stage to emit, as a further deflecting signal, a signal which is assigned to the binary values of a dual number, when the first deflecting stage is assigned to the number of the particular line to be represented and when the signals at the outputs of the adder are conducted to the image generator.

In order to be able to match the speed at which the characters are displaced on the screen to the particular requirements of the observer, it is advantageous for the saw-tooth shaped deflecting signal to possess a variable gradient.

A particularly uniform displacement of the characters is achieved if the deflecting stage produces the pulse during the reverse movement (flyback) of the electron beam on the screen.

If the characters on the screen are to be uniformly displaced one after another by several rows, it is expendient if the deflecting stage automatically emits the further deflecting signal whenever it has reached its amplitude.

If, however, the characters are to be displaced only by one row, it is expendient for the deflecting stage to emit the further deflecting signal whenever a push buttom is operated.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
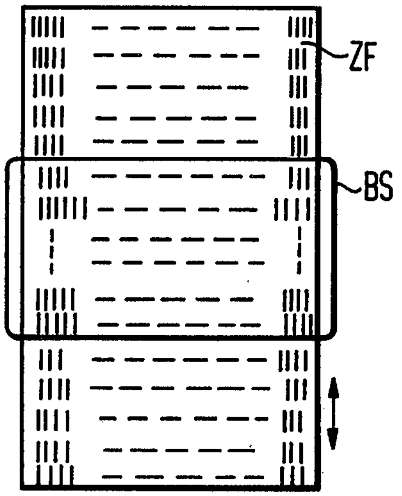
FIG. 1 is a schematic representation of characters which are to be represented on a screen of a data viewing device.

The characters collected in a character array ZF are to be represented on the screen BS of a data viewing device illustrated in FIG. 1. However, the character array ZF contains more rows than can be simultaneously on the screen BS. Nevertheless, in order to be able to represent the entire character array ZF on the screen BS, the rows on the screen of known data viewing devices are displaced by stages at the successive instant of time in such a manner that in each case the characters in the first row on the screen are erased, all of the characters are displaced upwardly by one row, and another row of the charcter array is represented on the screen. The characters can also be displaced in the downward direction in a similar manner.

The speed of the displacement is designed to be such that an observer can accommodate all of the characters of the character array ZF on the screen of the data viewing device, or the displacement is triggered by the observer, for example by the depression of a push button, row-by-row. As, however, the displacement is effected in stages, the read-out of the characters is greatly obstructed and the danger exists that the observer will lose his bearings on the screen.

Figure 2:
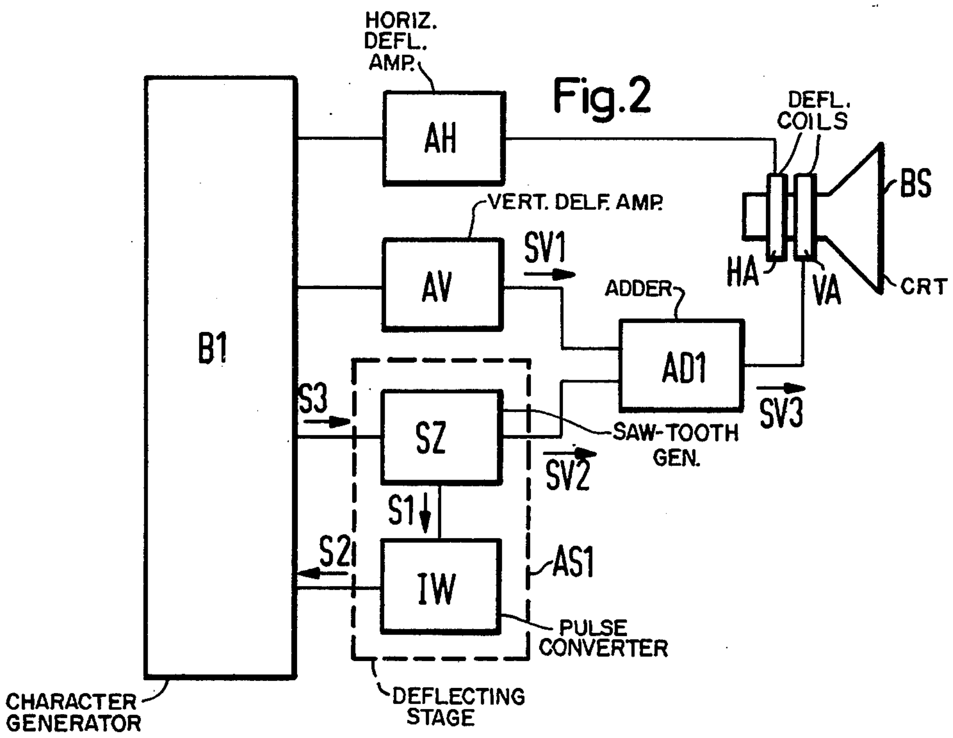
FIG. 2 is a block circuit diagram of a data viewing device which is provided with a circuit arrangment for uniformly displacing the characters on the screen.

FIG. 2 illustrates a block circuit diagram of a data viewing device in which the characters on the screen are displaced, not by stages, but uniformly. The characters are stored in a known manner in an image structure generator B1, and are prepared for representation on the screen of an electron beam tube. The image structure generator B1 emits image signals to a deflecting amplifier AH which deflects the electron beam in the horizontal direction and to a deflecting amplifier AV which deflects the electron beam in the vertical direction. The outputs of the deflecting amplifiers AH and AV are connected to deflecting coils HA and VA of the electron beam tube.

By means of a deflecting stage AS1, and an adder AD1, a further saw-tooth shaped deflecting signal SV2 is added to the deflecting signal SV1 emitted by the deflecting amplifier AV. The further deflecting signal SV2 is produced in a saw-tooth generator SZ and is fed to the adder AD1. At the output of the adder AD1 a deflecting signal SV3 is emitted which causes the characters to be displaced on the screen. The speed at which the characters are displaced is determined by the gradient of the saw-tooth shaped deflecting signal SV2. The amplitude of the saw-tooth signal corresponds to a displacement of the characters by one row, and when the deflecting signal SV2 has reached this amplitude, it is removed, and the characters on the screen are displaced in the usual manner by one row. For this purpose, the saw-tooth generator SZ emits a signal S1 to a pulse converter 1W which, whenever the saw-tooth signal has reached its amplitude and is reset to the initial value, emits a pulse S2 to the image structure generator B1. This pulse S2 triggers a displacement of the characters on the screen by one row in a known manner. An observer of the screen of the data viewing device is therefore presented with an image which appears to be moving uniformly upwardly or downwardly on the screen.

In order to prevent any disturbances during the displacement of the characters, the deflecting stage AS1 is supplied by the image structure generator B1 with a signal S3 which releases the saw-tooth generator SZ. The signal S3 can also result in a single emission of a deflecting signal SV2. It is triggered, for example, as the result of the depresion of a push button. In this case, it is advantageous for the signal S3 to be synchronized with the image flyback.

Figure 3:
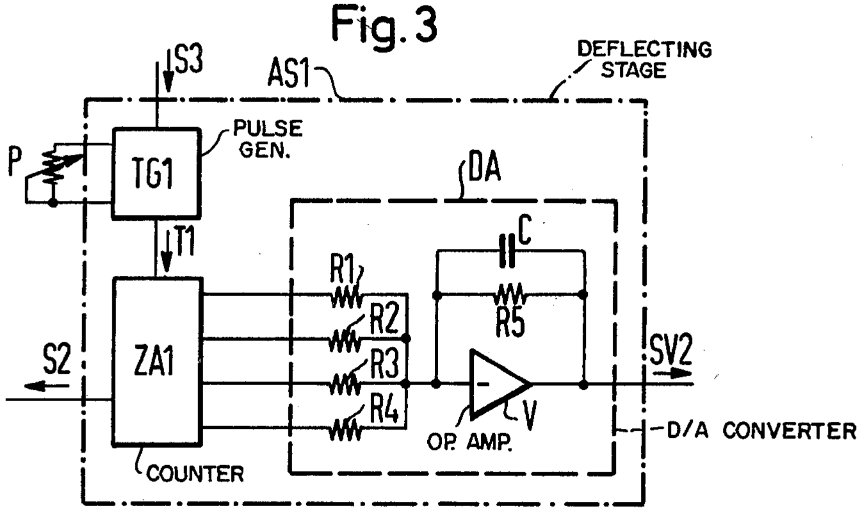
FIG. 3 is a schematic circuit diagram of a deflecting stage for use in practicing the invention.

The deflecting stage AS1 which is illustrated in FIG. 3 and which serves for producing the deflecting signal SV2 contains a pulse generator TG1 which produces timing pulses T1. The repetition frequency of the timing pulses T1 is variable and is set, for example, with the aid of a variable impedance P. The timing pulses T1 are fed to a counter ZA1, for example in the form of a 4-bit dual counter. The counter counts the time pulses T1 and at its output emits signals having binary values which are assigned to the number of timing pulses T1 in dual number form. The binary signals are fed to a digital-analog converter DA which, at its output, produces the deflecting signal SV2 which has instantaneous values corresponding to the counts of the counter SZ1.

After each 16 timing pulses T1, the counter ZA1 has reached its final value and produces a transfer signal. The transfer signal is fed as a pulse S2 to the image structure generator B1 and causes the characters on the screen to be displaced by one row. At the same time, the counter ZA1 is reset to its initial value "0". Subsequently, the counter ZA1 starts to count upwardly again and the deflecting signal SV2 increases its instantaneous values.

The pulse generator TG1 is controlled with the aid of the signals S3 from the image structure generator B1 to ensure that the displacement of the characters by one row in each case occurs during the image flyback.

The digital-analog converter comprises, in a known manner, a network formed of four resistors R1 to R4, an operational amplifier V and a negative feedback resistor R5. The values of the resistors R1 to R4 are graded in accordance with the values of the binary signals. The currents through the resistors R1 to R4 are added by the amplifier V and the instantaneous values of the deflecting signal SV2 at its output are proportional to the dual number represented by the binary values of the binary signals.

As the binary values do not alter continously, but with each timing pulse T1, a stepped deflecting signal SV2 is emitted at the output of the digital-analog converter DA. This signal can be smoothed, for example, by a capacitor C which is connected in parallel with the negative feedback resistor R5. In this manner, the deflecting signal SV2 is provided with a saw-tooth shaped wave form.

Of course, it is also possible to produce the deflecting signal SV2 with known saw-tooth generators, in which a capacitor is charged to a given voltage and is then very rapidly discharged. The pulse converter IW can, in this case, comprise a differentiator element which differentiates the deflecting signal SV2 and emits a pulse S2 each time the capacitor is discharged.

Figure 4:
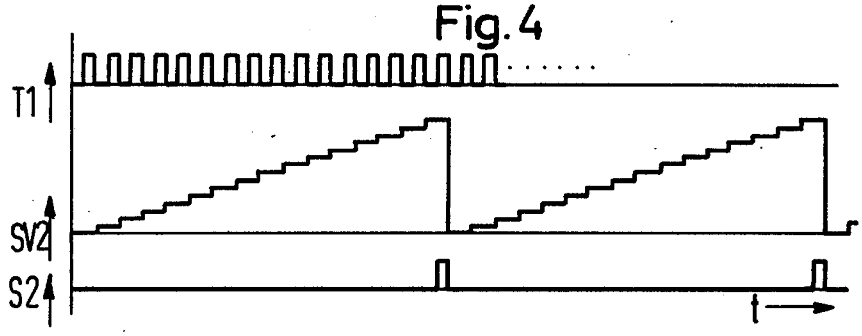
FIG. 4 is a timing diagram of signals at various points of the deflecting stage illustrated in FIG. 3.

The timing diagram of FIG. 4 illustrates signals which occur at various points of the deflecting stage AS1 illustrated in FIG. 3. Instantaneous values of the signals are plotted in the ordinate direction and the time t is plotted in the abscissa direction.

The timing signals T1 emitted from the pulse generator TG1 have a pulse duration, for example, which is equal to half the period duration. The repetition frequency of the timing pulse T1 is set by the variable impendance P on the pulse genertor TG1, and it determines the gradient of the saw-tooth wave and, therefore, the speed at which the characters are displaced on the screen. The value of the impedance P is set, for example, with the aid of a lever arranged on the data viewing device, which lever is mechanically connected to the tap of the impedance P which is in the form of a potentiometer. In this way, any observer can determine the speed at which the rows are displaced.

The deflecting signal SV2 displays a stepped course in which it is emitted at the output of the digital-analog converter DA when the capacitor C is not provided. After each 16 timing pulses T1, the counter AZ1 reaches its final value and emits the transfer signal as the pulse S2. With the next timing pulses, the counter is first reset to its initial value and then starts to count upwardly again. The amplitude of the deflecting signal SV2 corresponds to a deflection of the electron beam by one row. With the signal S2, the characters in the data viewing device are displaced by one row on the screen and with the regrowth of the deflecting signal SV2, the characters are displaced in such a manner that a uniformly displaced image is formed for the observer.

If it is desired to displace the characters in the horizontal direction, similarly, a saw-tooth shaped further deflecting signal is added to the deflecting signal SV1 for deflecting the electron beam in the horizontal direction. In this case, the amplitude of this further deflecting signal corresponds to the displacement of the electron beam by one column on the screen.

If the data viewing device is operating by the line-raster method in which the electron beam scans the screen line-by-line similarly as in television, the uniform displacement of the characters on the screen is achieved, in that the item of information which belongs to a line (television line) is written into an adjacent line, and thus displaced. When the extend of the displacement has reached the extend of a row containing the characters, the characters are displaced by one row in a known manner.

Figure 5:
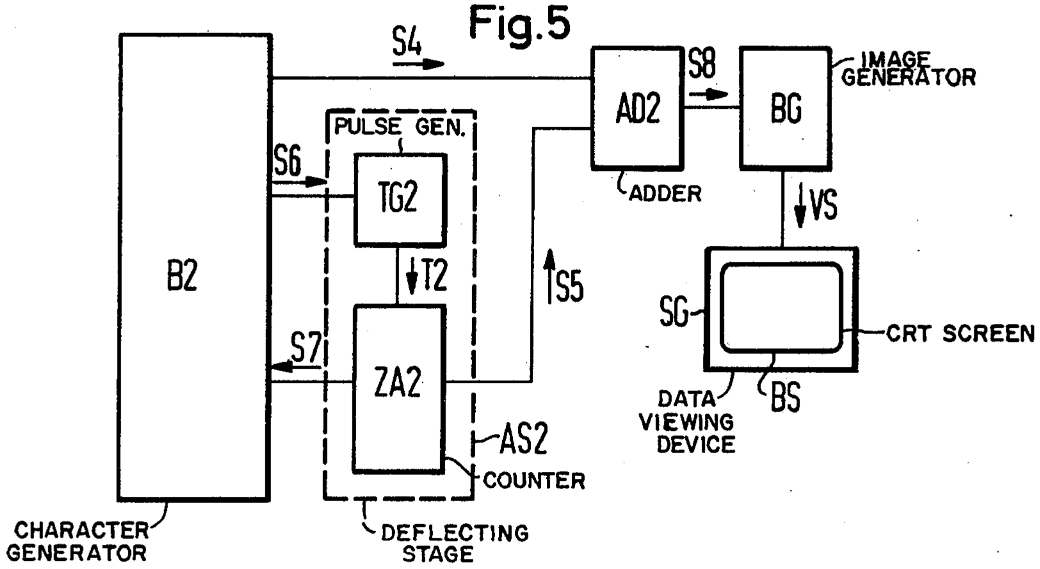
FIG. 5 is a block circuit diagram of a data viewing device which is provided with a circuit arrangement for uniformly displacing the characters on the screen, and which operates by the line-raster method.

The block circuit diagram illustrated in FIG. 5 shows such an arrangement for representing characters by the line-raster method. An image structure generator B2 stores the characters which are to be represented in the rows and columns on the screen B1 and emits signals S4 which, in the form of a dual number, represent the number of lines to be represented on the screen, to a first input of an adder AD2. The second input of the adder AD2 is supplied with a signal S5 which is produced by a deflecting stage AS2 and which likewise represents a dual number. The dual number constantly grows from the initial value of 0 to a final value and therefore represents the characters of every row successively in various lines. When the dual number at the output of the deflecting stage AS2 is equal to the number of the lines of a row, it reassumes the initial value 0 and again starts to grow. The speed at which the dual number changes is, in turn, a gauge for the speed at which the characters are displaced on the screen.

The deflecting stage AS2 contains a pulse generator TG2 which is controlled by means of the signals S6 from the image structure generator B2 and which feeds the timing pulses T2 to a counter ZA2. The counter ZA2 is of similar construction to the counter ZA1 and, in accordance with the number of lines out of which row a row is in each case constructed, feeds a pulse S7 to the image structure genertor B2 which, in the usual manner, displaces the characters by one row. At the same time, the counter is reset to its initial value and starts to count upwardly again, or waits for a new signal S3 which is emitted as a new start command from a keyboard.

The signals S8 at the output of the adder AD2 are fed to an image generator BG which assigns the characters in each row to the corresponding line and produces a video signal VS. The video signal VS is fed, for example, to a data viewing device SG which comprises a television monitor, and the signals are formed for brightening the electron beam on the screen BS.

The speed at which the characters are displaced on the screen is here again determined by the repetition frequency of the timing pulses T2.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a data system in which a circuit arrangement displaces characters representing an image content on the screen of a data viewing device, the characters being produced by a character generator and presented in a plurality of rows and a plurality of columns on the screen, and in which an electron beam is moved over the screen in the vertical direction by a first deflecting signal and in the horizontal direction by a second deflecting signal applied to respective deflection circuits and produced by a respetive first and second deflection stages under the control of the character generator, which may be stepped through a character sequence, the improvement therein comprising:

a third deflection stage connected to the character generator and operable to produce a third, saw-tooth deflection signal having an amplitude which is equal to the value of one of the first and second deflection signals and a repetition rate that is significantly less than the image change frequency, and to produce, at the maximum amplitude of the third deflection signal, a pulse to step the character generator; and an adder connected between the one of the first and second deflection stages corresonding to the deflection signal having the amplitude equal to that of the third deflection signal and the respective deflection circuit and connected to said third deflection stage to add said third deflection signal with the associated one of said deflection signals to provide a composite signal which causes, in consecutive intervals of time, the uniform addition of parts of the image content at one edge of the screen and the removal of corresonding parts of the image content at the opposite edge of the screen to provide a continuous and uniformly moving image on the screen.

2. The improved data system of claim 1, wherein said third deflection stage comprises a saw-tooth genertor for producing said third, saw-tooth deflection signal, and a pulse converter connected to said saw-tooth generator and responsive to the maximum amplitude of the saw-tooth deflection signal to produce the pulse for stepping the character generator.

3. The improved data system of claim 2, wherein said saw-tooth generator and said pulse converter are constituted by a counter and a clock pulse generator connected to said counter which causes said counter to count clock pulses and emit the character generator stepping pulse at a predetermined count, and a digital-analog transducer for producing said third deflection signal in response to a predetermined count.

4. The improved data system of claim 3, wherein said saw-tooth generator comprises means for providing said third deflection signal with a variable slope.

5. The improved data system of claim 4, comprising means for controlling the production of the character generator stepping pulse during the electron beam return on the screen of the data viewing device.

* * * * *